(12) United States Patent
Liu et al.

(10) Patent No.: US 10,913,447 B2
(45) Date of Patent: Feb. 9, 2021

(54) CONTROL METHOD AND SYSTEM FOR CLUTCH ENGAGEMENT OF HYBRID VEHICLE

(71) Applicant: Guangzhou Automobile Group Co., Ltd, Guangdong (CN)

(72) Inventors: Tao Liu, Guangdong (CN); Jinhang Wang, Guangdong (CN); Kai Xiao, Guangdong (CN); Changhong Wei, Guangdong (CN); Dan Wei, Guangdong (CN)

(73) Assignee: Guangzhou Automobile Group Co., Ltd., Guangdong (CN)

( * ) Notice: Subject to any disclaimer, the term of this patent is extended or adjusted under 35 U.S.C. 154(b) by 341 days.

(21) Appl. No.: 16/095,949

(22) PCT Filed: Apr. 27, 2017

(86) PCT No.: PCT/CN2017/082098
§ 371 (c)(1),
(2) Date: Oct. 24, 2018

(87) PCT Pub. No.: WO2017/186133
PCT Pub. Date: Nov. 2, 2017

(65) Prior Publication Data
US 2019/0152470 A1 May 23, 2019

(30) Foreign Application Priority Data
Apr. 28, 2016 (CN) .......................... 2016 1 0281091

(51) Int. Cl.
*B60W 20/40* (2016.01)
*B60W 10/02* (2006.01)
(Continued)

(52) U.S. Cl.
CPC ............... *B60W 20/40* (2013.01); *B60K 6/26* (2013.01); *B60W 10/02* (2013.01); *B60W 10/06* (2013.01);
(Continued)

(58) Field of Classification Search
CPC ...... B60W 20/40; B60W 10/06; B60W 10/08; B60W 20/10; B60W 50/00; B60W 10/02;
(Continued)

(56) References Cited

U.S. PATENT DOCUMENTS 8,308,593 B2 * 11/2012 Kumazaki .............. B60K 6/445
475/5
2002/0137596 A1 9/2002 Markyvech
(Continued)

FOREIGN PATENT DOCUMENTS

CN 102278391 A 12/2011
CN 104554240 A 4/2015
(Continued)

*Primary Examiner* — Russell Frejd
(74) *Attorney, Agent, or Firm* — Gang Yu (57) ABSTRACT

Provided is a control method and system for clutch engagement of a hybrid vehicle. The control method includes: when the hybrid vehicle meets a condition of adjusting a rotational speed of an engine, controlling the hybrid vehicle to enter a mode of adjusting the rotational speed of the engine, and determining a target rotational speed of the engine according to a rotational speed of a drive motor as well as transmission ratios of the engine and the drive motor to a drive wheel end and drive relationships of the engine and the drive motor with the drive wheel end; and when a difference value between the rotational speed of the engine and the target rotational speed of the engine is constantly smaller than a threshold value within a set time, controlling a clutch of the hybrid vehicle to be engaged.

20 Claims, 4 Drawing Sheets

When the hybrid vehicle meets a condition of adjusting a rotational speed of an engine, control the hybrid vehicle to enter a mode of adjusting the rotational speed of the engine, and determine a target rotational speed of the engine according to a rotational speed of a drive motor as well as transmission ratios of the engine and the drive motor to a drive wheel end and drive relationships of the engine and the drive motor with the drive wheel end ⟶ S110

When a difference value between the rotational speed of the engine and the target rotational speed of the engine is constantly smaller than a threshold value within a set time, control a clutch of the hybrid vehicle to be engaged ⟶ S120

(51) Int. Cl.
*B60K 6/26* (2007.10)
*B60W 10/06* (2006.01)
*B60W 10/08* (2006.01)
*B60W 20/10* (2016.01)
*B60W 50/00* (2006.01)

(52) U.S. Cl.
CPC ............ *B60W 10/08* (2013.01); *B60W 20/10* (2013.01); *B60W 50/00* (2013.01); *B60K 2006/268* (2013.01); *B60W 2050/0011* (2013.01); *B60W 2510/081* (2013.01); *B60W 2510/244* (2013.01); *B60W 2520/10* (2013.01); *B60W 2540/10* (2013.01); *B60W 2710/02* (2013.01); *B60W 2710/0644* (2013.01); *B60W 2710/0666* (2013.01); *B60W 2710/083* (2013.01); *B60Y 2200/92* (2013.01); *Y02T 10/62* (2013.01)

(58) Field of Classification Search
CPC ... B60W 2050/0011; B60W 2510/081; B60W 2510/244; B60W 2520/10; B60W 2540/10; B60W 2710/02; B60W 2710/0644; B60W 2710/0666; B60W 2710/083; B60W 2510/0638; B60W 2710/081; B60W 2050/0096; B60W 2050/0075; B60W 20/00; B60W 20/19; B60W 30/186; B60W 30/19; B60W 2510/0208; B60K 6/26; B60K 2006/268; B60K 6/36; B60K 6/442; B60K 6/387; Y02T 10/62; B60Y 2200/92
See application file for complete search history.

(56) References Cited

U.S. PATENT DOCUMENTS

| | | | |
|---|---|---|---|
| 2006/0135317 A1 | 6/2006 | Jacobs | |
| 2007/0087894 A1* | 4/2007 | Tsuneyoshi | B60W 20/00 477/3 |
| 2013/0157806 A1* | 6/2013 | Koyama | B60W 20/00 477/5 |
| 2016/0031438 A1* | 2/2016 | Matsui | B60K 6/442 701/22 |

FOREIGN PATENT DOCUMENTS

| | | |
|---|---|---|
| CN | 104842992 A | 8/2015 |
| CN | 104948728 A | 9/2015 |
| CN | 105946844 A | 9/2016 |
| JP | 2006170336 A | 6/2006 |
| JP | 2012081810 A | 4/2012 |

\* cited by examiner

When the hybrid vehicle meets a condition of adjusting a rotational speed of an engine, control the hybrid vehicle to enter a mode of adjusting the rotational speed of the engine, and determine a target rotational speed of the engine according to a rotational speed of a drive motor as well as transmission ratios of the engine and the drive motor to a drive wheel end and drive relationships of the engine and the drive motor with the drive wheel end ⟶ S110

When a difference value between the rotational speed of the engine and the target rotational speed of the engine is constantly smaller than a threshold value within a set time, control a clutch of the hybrid vehicle to be engaged ⟶ S120

CONTROL METHOD AND SYSTEM FOR CLUTCH ENGAGEMENT OF HYBRID VEHICLE

TECHNICAL FIELD

The present disclosure relates to the technical field of hybrid vehicle control, and more particularly, to a control method and system for clutch engagement of a hybrid vehicle.

BACKGROUND

While fuel consumption and emission standard are increasingly strict, reducing the fuel consumption has become a key point for each automobile manufacturer in research and development, and developing a new energy vehicle has become an important trend at present. A hybrid vehicle employs an engine and a drive motor as a power source and may implement pure electric drive at a low speed and parallel drive at a high speed, so that the fuel consumption and the emission are effectively reduced and the power performance required by the hybrid vehicle is provided well.

When the parallel drive is performed on the hybrid vehicle, clutch engagement is needed. The engagement effect of the clutch affects the power output and the driving comfort of the hybrid vehicle. The clutch engagement control in a related technology has the characteristics that the power output of the hybrid vehicle is interrupted, the time for speed adjustment and engagement control is long and the control is complex and unstable. When the clutch is engaged, due to the relatively large change of the power output, it is very easy to have a bumpy driving feeling of the hybrid vehicle and thus the driving comfort of the hybrid vehicle is seriously affected. Moreover, during the process when the clutch is engaged, a relatively large impact is easily caused to affect the service life of the clutch or even cause damage to the clutch and the mechanical structure of various components in the hybrid vehicle and then cause a danger possibly.

SUMMARY

In view of the above, some embodiments of the present disclosure provide a control method and system for clutch engagement of a hybrid vehicle, which may solve problems in related technologies, prevent the impact in a clutch engagement process, avoid the excessive wear and tear of the clutch and do not affect the driving comfort of the hybrid vehicle.

To this end, the technical solutions adopted by the embodiments of the present disclosure are as follows.

A control method for clutch engagement of a hybrid vehicle may include the following acts.

When the hybrid vehicle meets a condition of adjusting a rotational speed of an engine, the hybrid vehicle is controlled to enter a mode of adjusting the rotational speed of the engine, and a target rotational speed of the engine is determined according to a rotational speed of a drive motor as well as transmission ratios of the engine and the drive motor to a drive wheel end and drive relationships of the engine and the drive motor with the drive wheel end.

When a difference value between the rotational speed of the engine and the target rotational speed of the engine is constantly smaller than a threshold value within a set time, a clutch of the hybrid vehicle is controlled to be engaged, where the clutch is respectively connected to the drive motor and the engine.

Another embodiment of the present disclosure provides a control system for clutch engagement of a hybrid vehicle, which may include a condition detection and determination apparatus, an engine speed adjustment control apparatus and an engagement apparatus.

The condition detection and determination apparatus is configured to determine whether the hybrid vehicle meets a condition of adjusting a rotational speed of an engine.

The engine speed adjustment control apparatus is configured to control, when the hybrid vehicle meets the condition of adjusting the rotational speed of the engine, the hybrid vehicle to enter a mode of adjusting the rotational speed of the engine, and determine a target rotational speed of the engine according to a rotational speed of a drive motor as well as transmission ratios of the engine and the drive motor to a drive wheel end and drive relationships of the engine and the drive motor with the drive wheel end.

The engagement apparatus is configured to control, when a difference value between the rotational speed of the engine and the target rotational speed of the engine is constantly smaller than a threshold value within a set time, a clutch of the hybrid vehicle to be engaged, where the clutch is respectively connected to the drive motor and the engine.

Based on the technical solutions of some embodiments of the present disclosure, the difference value between the rotational speed of the engine and the target rotational speed of the engine is stabilized within a certain range, so that the clutch is engaged under the premise that the engine and the drive motor are coordinated. In this way, the impact, in the clutch engagement process can be prevented, the risk is reduced, the excessive wear and tear of the clutch is avoided, and the service life is prolonged. And meanwhile, in the process when the rotational speed of the engine is adjusted and the clutch is engaged, the drive, motor continuously outputs a torque to maintain the operation of the hybrid vehicle and provide a power for the hybrid vehicle together with the engine after the clutch is engaged. In this way, the power output in the whole process can be transited smoothly, the driving comfort of the hybrid vehicle is not affected, and the driving experience is improved.

DETAILED DESCRIPTION OF THE EMBODIMENTS

The contents of the present disclosure will be described in detail with reference to exemplary embodiments and accompanying drawings. The embodiments described hereinafter are merely for explaining the present disclosure and do not form a limit to the present disclosure. Based on the embodiments of the present disclosure, other embodiments obtained by those of ordinary skill in the art without any creative effort should pertain to the scope of protection of the present disclosure. It can be understood that terms "first", "second" and the like used in the application may be adopted to describe various information and are not intended to limit the information. These terms are only adopted to distinguish a same type of information from one another. For example, without departing from the scope of the present disclosure, the "first" information may also be called as the "second" information. Similarly, the "second" information may likewise be called as the "first" information. In addition, it is further to be noted that, for a simple description, the accompanying drawings only show the part of contents related to the embodiments of the present disclosure rather than all contents.

Figure 1:
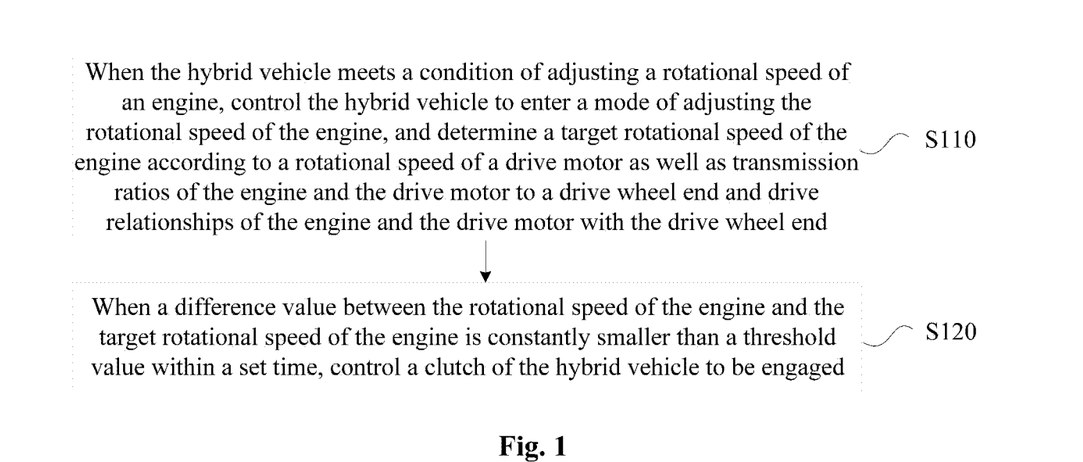
FIG. 1 is a schematic diagram showing the flow of a control method for clutch engagement of a hybrid vehicle according to an embodiment of the present disclosure.

FIG. 1 is a schematic diagram showing the flow of a control method for clutch engagement of a hybrid vehicle according to an embodiment of the present disclosure. The method in this embodiment may be executed by a vehicle controller of the hybrid vehicle. As shown in FIG. 1, the control method for clutch engagement of the hybrid vehicle in this embodiment may include the following acts S110 and S120.

At act S110, when the hybrid vehicle meets a condition of adjusting a rotational speed of an engine, the hybrid vehicle is controlled to enter a mode of adjusting the rotational speed of the engine, and a target rotational speed of the engine is determined according to a rotational speed of a drive motor as well as transmission ratios of the engine and the drive motor to a drive wheel end and drive relationships of the engine and the drive motor with the drive wheel end.

In a specific application, whether the hybrid vehicle meets the condition of adjusting the rotational speed of the engine or not may be determined by the vehicle controller of the hybrid vehicle according to an operation state of the hybrid vehicle. When the operation state of the hybrid vehicle needs to be maintained or adjusted by clutch engagement introducing the engine drive, the vehicle controller may determine that the hybrid vehicle meets the condition of adjusting the rotational speed of the engine. The vehicle controller may also make determination according to an instruction input by a driver. For example, when the driver wants to catch up with and surpass another car or wants to drive the hybrid vehicle to climb a slope, the driver starts the engine, and then may input an adjustment instruction to the vehicle controller. Upon the reception of the adjustment instruction, the vehicle controller determines that the hybrid vehicle meets the condition of adjusting the rotational speed of the engine and controls the hybrid vehicle to enter the mode of adjusting the rotational speed of the engine.

In an exemplary embodiment, the vehicle controller detects various parameters and fault events of the hybrid vehicle. The hybrid vehicle may be determined to meet the condition of adjusting the rotational speed of the engine when the following three conditions are met.

Condition 1: a current speed v of the hybrid vehicle is greater than a first speed set value $v_1$ corresponding to a position of an accelerator pedal at present.

Condition 2: a State of Charge (SOC) of a power battery of the hybrid vehicle at the current speed of the hybrid vehicle is within a first set range $F_1$.

Condition 3: the hybrid vehicle has no fault event affecting the clutch engagement at present.

As an exemplary implementation, the first speed set value corresponding to each position of the accelerator pedal may be stored in the vehicle controller in advance. The first speed set value reflects a preferred speed of the hybrid vehicle under a sole power source of the drive motor. The first speed set value corresponding to each position of the accelerator pedal may be obtained via a simulation test or experiment verification. If the current speed v of the hybrid vehicle exceeds the first speed set value $v_1$ corresponding to the position of the accelerator pedal at present, it is necessary to perform parallel drive on the engine and the drive motor.

In addition, the SOC of the power battery of the hybrid vehicle may also need to be considered. The SOC is a residual capacity and is also called as the state of charge. The SOC is a ratio of the residual capacity after the battery is used for a period of time or is unused for a long time to a capacity in a completely charged state. The SOC is generally represented as a percent with a value range of 0-1. When SOC=0, it is indicated that the battery is discharged completely. When SOC=1, it is indicated that the battery is charged completely. A first set range $F_1$ of the SOC of the corresponding power battery within which the mode of adjusting the speed of the engine is to be entered is stored in the vehicle controller in advance. When the SOC of the power battery is within the first set range $F_1$, it is also necessary to drive the engine.

In addition to the speed and the power battery, whether the hybrid vehicle has a fault event affecting the clutch engagement or not is suggested to be further considered. In this embodiment, the purpose of adjusting the rotational speed of the engine is to engage the clutch after the rotational speeds of the drive motor and the engine are consistent, thereby implementing the parallel drive. If the hybrid vehicle has a fault event affecting the clutch engagement at present, for example, an oil pressure sensor is in fault, the mode of adjusting the rotational speed of the engine is not entered.

When the above three conditions are met, the vehicle controller determines that the hybrid vehicle meets the condition of adjusting the rotational speed of the engine and thus controls the hybrid vehicle to enter the mode of adjusting the rotational speed of the engine and prepares to engage the clutch. At this moment, the drive motor continues to output a torque to maintain the operation of the hybrid vehicle.

In the mode of adjusting the rotational speed of the engine, the vehicle controller may determine the target rotational speed of the engine according to the transmission ratios of the engine and the drive motor to the drive wheel end and drive relationships of the engine and the drive motor with the drive wheel end. For example, if the rotational speed of the drive motor is $\omega$, the transmission ratio of the drive motor to the drive wheel end is $r_1$, the transmission ratio of the engine to the drive wheel end is $r_2$, and the target rotational speed of the engine is $\omega_0$, the following may be obtained according to the drive relationships.

$$\omega r_1 = \omega_0 r_2$$

Thus:

$$\omega_0 = \frac{\omega r_1}{r_2}$$

After the target rotational speed of the engine is obtained, the rotational speed of the engine is adjusted to be close to the target rotational speed.

At act S120, when a difference value between the rotational speed of the engine and the target rotational speed of the engine is constantly smaller than a threshold value within a set time, a clutch of the hybrid vehicle is controlled to be engaged, where the clutch is respectively connected to the drive motor and the engine.

In the mode of adjusting the rotational speed of the engine, the rotational speed of the engine is detected. When the difference value between the rotational speed of the engine and the target rotational speed of the engine is constantly smaller than the threshold value within a set time T, the engine and the drive motor are basically coordinated. At this moment, the clutch is controlled to be engaged. For example, after a hydraulic loop of the clutch is pre-charged with oil completely, the two ends of the clutch are quickly boosted to engage, and the drive motor and the engine are connected via, the clutch so that the hybrid vehicle enters a parallel drive mode and the power performance of the hybrid vehicle is improved. As an exemplary implementation in the mode of adjusting the rotational speed of the engine, the vehicle controller may continuously detect the rotational speed of the engine and the rotational speed of the drive motor. While the rotational speed of the drive motor changes, the target rotational speed of the engine also changes dynamically. When the rotational speed of the engine is close to the dynamically changing target rotational speed (the difference value between the rotational speed of the engine and the target rotational speed of the engine is constantly smaller than the threshold value within the set time T) and both are on a same level from the perspective of the drive wheel end, the engagement of the clutch is smoother.

Herein, the threshold value may be set according to an experimental test and is a critical value at which the clutch engagement does not have the impact or that is acceptable to the impact in the test. If a difference value between the rotational speed of the engine and the target rotational speed of the engine exceeds the threshold value, there will be a relatively large impact and even a risk of damaging the clutch during the clutch engagement.

The set time T is set in order to avoid the clutch engagement performed in a case where the over-adjustment is occurred during the process of adjusting the rotational speed of the engine. Generally, the set time T is set as about 0.1 s and may also be set according to an actual condition such as a speed adjustment effect and the like in a test or a simulation and emulation.

According to the control method for the clutch engagement of the hybrid vehicle provided by this embodiment, the difference value between the rotational speed of the engine and the target rotational speed of the engine is stabilized within a certain range, so that the clutch is engaged under the premise that the engine and the drive motor are coordinated. In this way, the impact in the clutch engagement process is prevented, the risk is reduced, the excessive wear and tear of the clutch is avoided, and the service life is prolonged. And meanwhile, in the process when the rotational speed of the engine is adjusted and the clutch is engaged, the drive motor continuously maintains the operation of the hybrid vehicle and provide a power for the hybrid vehicle together with the engine after the clutch is engaged. In this way, the power output in the whole process can be transited smoothly, the driving comfort of the hybrid vehicle is not affected, and the driving experience is improved.

Figure 2:
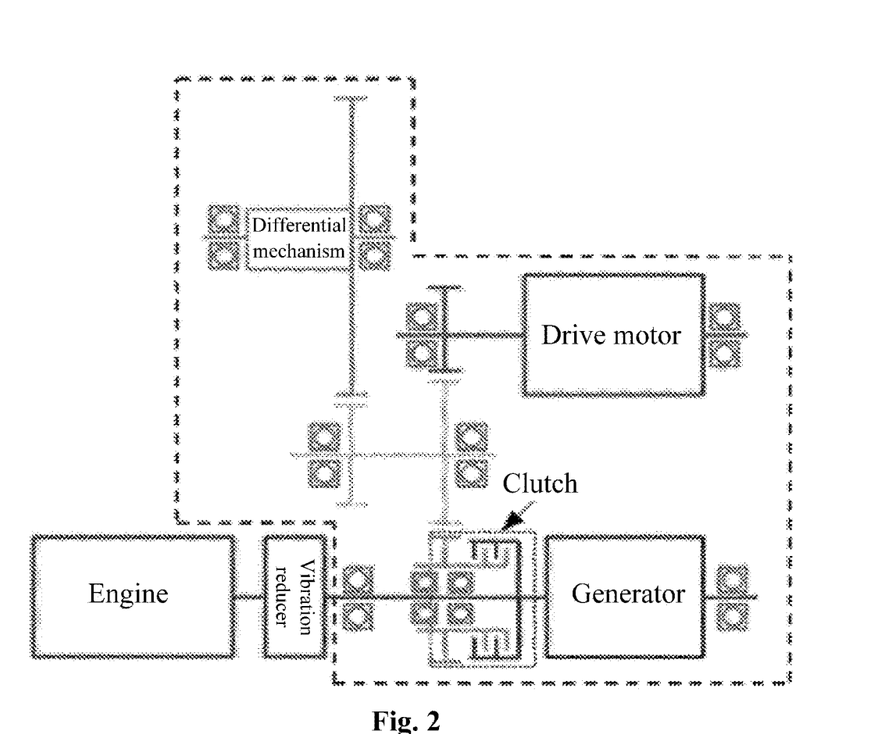
FIG. 2 is a schematic diagram showing the structure of a G-MC system according to an embodiment of the present disclosure.

The control method for the clutch engagement of the hybrid vehicle provided by this embodiment may be applied to a hybrid vehicle based on a G-MC system. Referring to FIG. 2, the G-MC system refers to an electromechanical coupling system integrated with a drive motor, a generator, a clutch and a speed changing gear, in which the generator is coaxially connected with the engine. Herein, the G refers to the drive motor, the M refers to the generator and the C refers to the clutch. When the power battery has a sufficient capacity, pure electric drive may be adopted by the hybrid vehicle based on the G-MC system. When the capacity is insufficient, the whole vehicle may operate in serial or parallel drive mode.

As an exemplary implementation, an Integrated Starter and Generator (ISG) may be used as the generator. The ISG has a relatively large transient power, so the ISG, when being applied to the hybrid vehicle, may replace an engine to drive the hybrid vehicle for a short time at a start-up stage and simultaneously take the effect of starting the engine and reduce the idle loss and pollution of the engine. However, when the hybrid vehicle is driven by the engine, the motor is disconnected or takes the effect of the generator. During brake, the motor may further take the energy-saving effects of regenerating the electricity and recycling the brake energy. In this embodiment, the ISG is adopted as the generator in the G-MC system and the ISG is coaxially connected with the engine. By controlling the rotational speed of the ISG, the rotational speed of the engine may be adjusted. As an exemplary implementation, in the mode of adjusting the rotational speed of the engine, the rotational speed of the engine may be adjusted by using Proportion-Integral-Derivative (PID) control. The PID control refers to the control on a proportion, an integral and a derivative.

Figure 3:
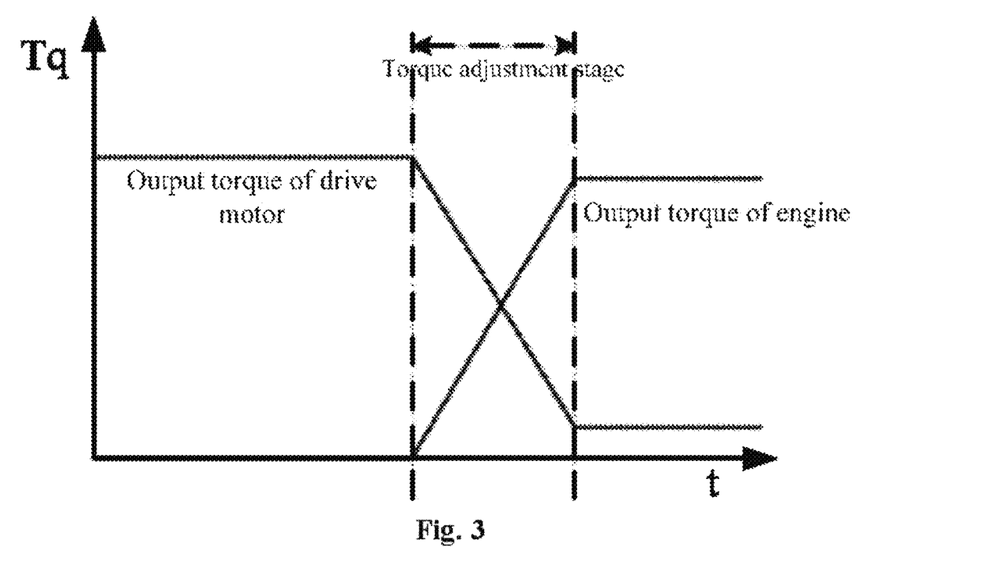
FIG. 3 is a schematic diagram of a curve for adjusting output torques of an engine and a drive motor according to an embodiment of the present disclosure.

According to the control method for the clutch engagement of the hybrid vehicle provided by this embodiment, after the vehicle controller controls the clutch to be engaged, an output torque of the engine and an output torque of the drive motor may be adjusted according to a total required torque. According to the driving requirement, by keeping the total required torque unchanged without affecting the operation of the hybrid vehicle, the output torque of the engine and the output torque of the drive motor may be reallocated and the parallel drive mode is maintained. As an exemplary implementation, in the parallel drive mode, the engine may work at a most economic state and output as a main power, and the residual power is supplementally provided by the drive motor. Therefore, in an optional manner, when the output torque of the engine and the output torque of the drive motor are adjusted, referring to FIG. 3, the output torque of the engine may be increased linearly according to a certain slope and the output torque of the drive motor may be reduced linearly according to a certain slope, making a sum of the output torque of the engine and the output torque of the drive motor equal to the total required torque which is unchanged.

In this embodiment, after the clutch of the hybrid vehicle is engaged, the hybrid vehicle enters the parallel drive mode, and the vehicle controller may still continuously detect the various parameters and fault events of the hybrid vehicle. When the various parameters and fault events of the hybrid vehicle meet a certain condition, the hybrid vehicle may be controlled to exit the parallel drive mode. In an exemplary embodiment, after the clutch is engaged, if any of the following two conditions is met, the clutch is controlled to be disengaged and exit the parallel drive mode.

(1) The current speed v of the hybrid vehicle is smaller than or equal to a second speed set value $v_2$ corresponding to the position of the accelerator pedal at present.

(2) The SOC of the power battery of the hybrid vehicle at the current speed of the hybrid vehicle is out of a second set range $F_2$.

As an exemplary implementation, the second speed set value corresponding to each position of the accelerator pedal may further be stored in the vehicle controller in advance. The second speed set value is a lower speed limit at which the hybrid vehicle exits the parallel drive mode. The second speed set value corresponding to each position of the accelerator pedal may be determined by the simulation test or experiment verification. If the current speed v of the hybrid vehicle is smaller than or equal to the second speed set value $v_2$ corresponding to the position of the accelerator pedal at present, the engine and the drive motor do not need to provide the power source simultaneously and thus the clutch is controlled to be disengaged and exit the parallel drive mode.

In addition, the second set range $F_2$ corresponding to the SOC of the power battery in which the parallel drive mode is to be exited may also be stored in the vehicle controller in advance. When the SOC of the power battery is out of the second set range $F_2$, the power battery has sufficient capacity, the clutch may be controlled to be disengaged and exit the parallel drive mode, and the hybrid vehicle is driven by the drive motor independently.

As an exemplary implementation, the second speed set value corresponding to each position of the accelerator pedal is smaller than the first speed set value, and the second set range includes the first set range. In this way, the effect of a hysteresis loop may be achieved, so that the hybrid vehicle is prevented from operating the clutch frequently at a critical state to damage the clutch.

Figure 4:
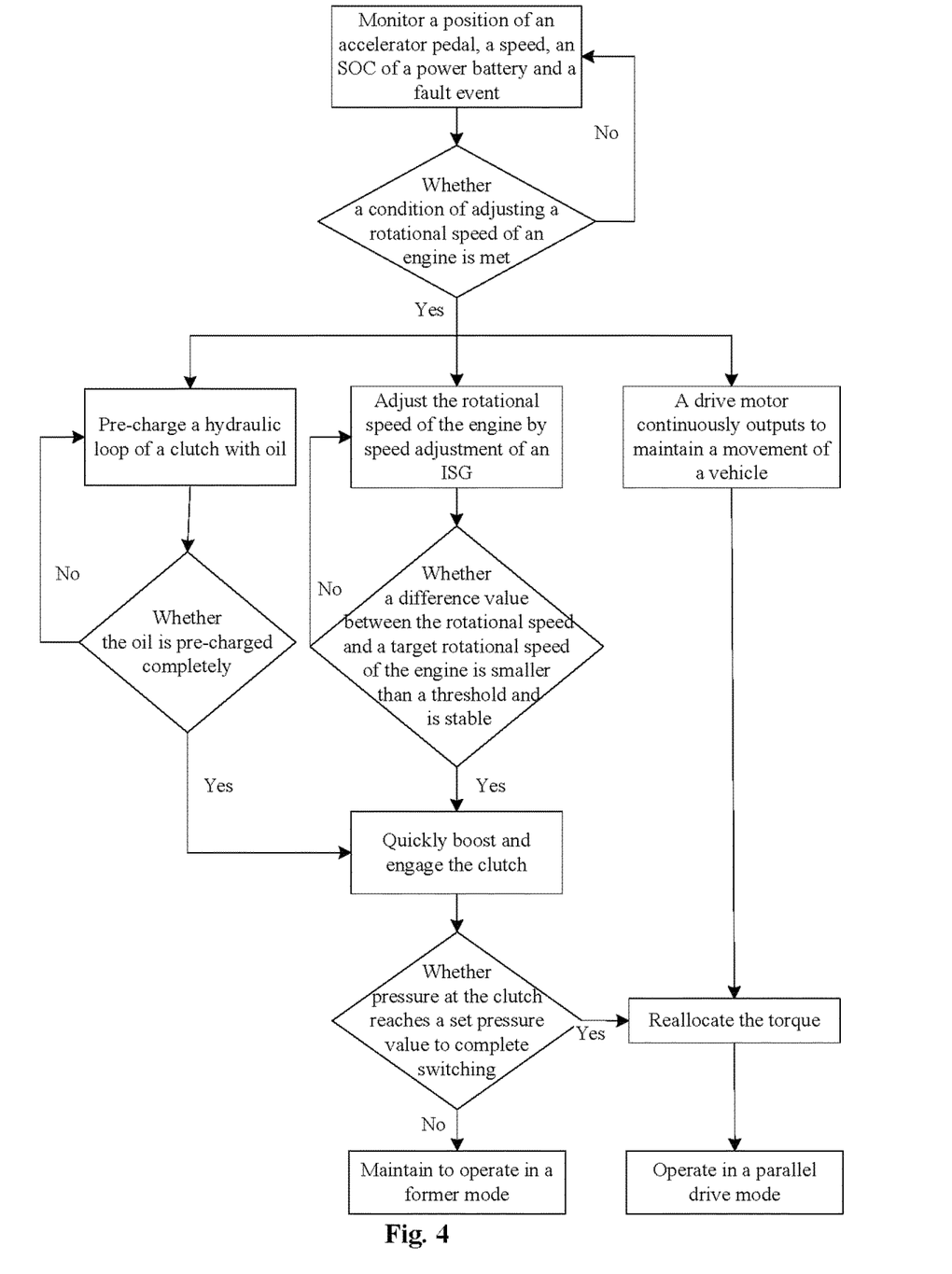
FIG. 4 is a schematic diagram showing the flow of a control method for clutch engagement of a hybrid vehicle according to another embodiment of the present disclosure.

FIG. 4 is a schematic diagram showing the flow of a control method for clutch engagement of a hybrid vehicle according to another embodiment of the present disclosure. Referring to FIG. 4 and referring to FIG. 1 to FIG. 3, in this embodiment, the vehicle controller may detect the position of the accelerator pedal of the hybrid vehicle, the speed and the SOC of the power battery in real time, and determine whether a fault event affecting the clutch engagement exists or not. When the hybrid vehicle is determined to meet the conditions of adjusting the rotational speed of the engine via these determination factors, the hybrid vehicle is controlled to enter the mode of adjusting the rotational speed of the engine. At this moment, by adjusting the rotational speed of the ISG of the hybrid vehicle, the rotational speed of the engine may be adjusted. Furthermore, the hydraulic loop of the clutch is pre-charged with the oil and the drive motor in the whole process continuously outputs the torque to maintain the movement of the hybrid vehicle. The vehicle controller may determine the target rotational speed of the engine according to the rotational speed of the drive motor as well as the transmission ratios of the engine and the drive motor to the drive wheel end and the drive relationships of the engine and the drive motor with the drive wheel end. When the difference value between the rotational speed of the engine and the target rotational speed of the engine is constantly smaller than the threshold value, the two ends of the clutch are boosted quickly to engage. When the pressures at the two ends of the clutch reach a set pressure value, the clutch engagement of the hybrid vehicle is completed, the drive motor and the engine are connected via the clutch and the hybrid vehicle enters the parallel drive mode. Thereafter, the output torque of the drive motor and the output torque of the engine are reallocated according to the total required torque of the hybrid vehicle, thus maintaining the operation of the hybrid vehicle in the parallel drive mode. If the pressures at the two ends of the clutch do not reach the set pressure value, the engagement fails, the parallel drive mode cannot be entered and the hybrid vehicle is maintained to operate in the former mode.

According to the control method for the clutch engagement of the hybrid vehicle provided by the embodiments of the present disclosure, after the engine is started, the rotational speed of the engine may be adjusted by controlling the rotational speed of the ISG. The clutch engagement is performed under a condition in which a difference value between the rotational speed of the engine and the target rotational speed of the engine is stabilized within a certain range. At this moment, the engine and the drive motor are basically coordinated, so the impact in the clutch engagement process can be prevented, the risk is reduced, the excessive wear and tear of the clutch is avoided, and the service life is prolonged. And meanwhile, in the process when the rotational speed of the engine is adjusted and the clutch is engaged, the drive motor still maintains the operation state of the hybrid vehicle, and after the clutch is engaged, the drive motor and the engine are taken as the power sources together to provide the power for the hybrid vehicle. In this way, the power output in the whole process can be transited smoothly, the driving comfort of the hybrid vehicle is not affected, and the driving experience is improved effectively compared with the related technology.

It should be noted that, the method embodiments are expressed as combinations of a series of actions for the purpose of simple description, but those skilled in the art should learn that the embodiments of the present disclosure are not limited by the described action sequence, because some acts may be carried out in another sequence or be simultaneously performed according to the embodiments of the present disclosure.

According to the control method for the clutch engagement of the hybrid vehicle provided by the embodiments of the present disclosure, another embodiment of the present disclosure provides a control system for the clutch engagement of the hybrid vehicle. The control system for the clutch engagement of the hybrid vehicle provided by the embodiment of the present disclosure will be described below in detail with reference to the accompanying drawings and exemplary embodiments.

Figure 5:
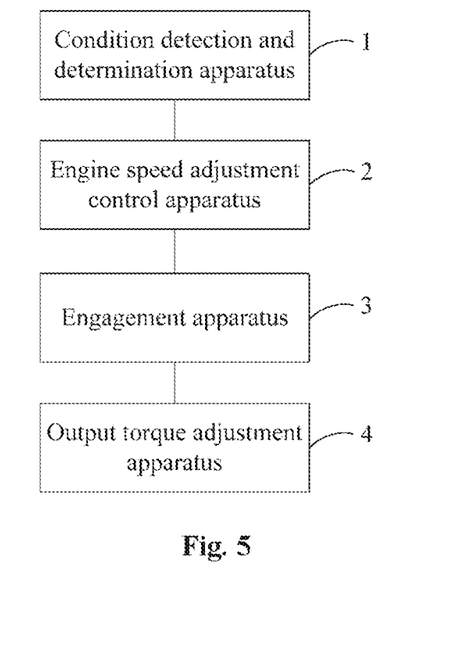
FIG. 5 is a schematic diagram showing the structure of a control system for clutch engagement of a hybrid vehicle according to an embodiment of the present disclosure.

FIG. 5 is a schematic diagram showing the structure of a control system for clutch engagement of a hybrid vehicle according to an embodiment of the present disclosure. As shown in FIG. 2, the system in this embodiment may include a condition detection and determination apparatus 1, an engine speed adjustment control apparatus 2 and an engagement apparatus 3.

The condition detection and determination apparatus 1 is configured to determine whether the hybrid vehicle meets a condition of adjusting a rotational speed of an engine.

The engine speed adjustment control apparatus 2 is configured to control, when the hybrid vehicle meets the condition of adjusting the rotational speed of the engine, the hybrid vehicle to enter a mode of adjusting the rotational speed of the engine, and determine a target rotational speed of the engine according to a rotational speed of a drive motor as well as transmission ratios of the engine and the drive motor to a drive wheel end and drive relationships of the engine, and the drive motor with the drive wheel end.

The engagement apparatus 3 is configured to control, when a difference value between the rotational speed of the engine and the target rotational speed of the engine is constantly smaller than a threshold value within a set time, a clutch of the hybrid vehicle to be engaged, where the clutch is respectively connected to the drive motor and the engine.

In a specific application, the condition detection and determination apparatus 1 may determine whether the hybrid vehicle meets the condition of adjusting the rotational speed of the engine or not according to an operation state of the hybrid vehicle. When the operation state of the hybrid vehicle needs to be maintained or adjusted by clutch engagement introducing the engine drive, the condition detection and determination apparatus 1 determines that the hybrid vehicle meets the condition of adjusting the rotational speed of the engine. The condition detection and determination apparatus 1 may also make determination according to an instruction input by a driver. For example, the driver wants to catch up with and surpass another car or wants to drive the hybrid vehicle to climb a slope, an adjustment instruction may be input to the condition detection and determination apparatus 1. Upon the reception of the adjustment instruction, the condition detection and determination apparatus 1 determines that the hybrid vehicle meets the condition of adjusting the rotational speed of the engine, and then the engine speed adjustment control apparatus 2 controls the hybrid vehicle to enter the mode of adjusting the rotational speed of the engine.

In an exemplary embodiment, the condition detection and determination apparatus 1 detects various parameters and fault events of the hybrid vehicle. The hybrid vehicle may be determined to meet the condition of adjusting the rotational speed of the engine when the following three conditions are met.

Condition 1: a current speed v of the hybrid vehicle is greater than a first speed set value $v_1$ corresponding to a position of an accelerator pedal at present.

Condition 2: an SOC of a power battery of the hybrid vehicle at the current speed of the hybrid vehicle is within a first set range $F_1$.

Condition 3: the hybrid vehicle has no fault event affecting the clutch engagement at present.

When the above three conditions are met, the condition detection and determination apparatus 1 determines that the hybrid vehicle meets the condition of adjusting the rotational speed of the engine, the engine speed adjustment control apparatus 2 controls the hybrid vehicle to enter the mode of adjusting the rotational speed of the engine, and the engagement apparatus 3 prepares to control the engagement of the clutch. At this moment, the drive motor continues to output a torque to maintain the operation of the hybrid vehicle.

In the mode of adjusting the rotational speed of the engine, the engine speed adjustment control apparatus 2 may determine the target rotational speed of the engine according to the transmission ratios of the engine and the drive motor to the drive wheel end and the drive relationships of the engine and the drive motor with the drive wheel end as well as the rotational speed of the drive motor, and adjust the rotational speed of the engine to be close to the target rotational speed.

If the hybrid vehicle in this embodiment is a hybrid vehicle based on a G-MC system, the engine speed adjustment control apparatus 2 may adjust the rotational speed of the engine by controlling the rotational speed of the generator in the hybrid vehicle. As an exemplary implementation, an ISG may be used as the generator in the hybrid vehicle based on the G-MC system, and the ISG is coaxially connected with the engine. The engine speed adjustment control apparatus 2 may adjust the rotational speed of the engine by controlling the rotational speed of the ISG. As an exemplary implementation, the engine speed adjustment control apparatus 2 may adjust the rotational speed of the engine by using PID control. The PID control is widely applied to various industrial control fields because of its outstanding advantages.

In the mode of adjusting the rotational speed of the engine, when the difference value between the rotational speed of the engine and the target rotational speed of the engine is constantly smaller than the threshold value within a set time T, the engine and, the drive motor are basically coordinated. At this moment, the engagement apparatus 3 controls the clutch engagement of the hybrid vehicle. For example, after the hydraulic loop of the clutch is pre-charged with oil completely, two ends of the clutch are quickly boosted to engage, so that the hybrid vehicle enters the parallel drive mode and the power performance of the hybrid vehicle is improved.

According to the control system for the clutch engagement of the hybrid vehicle provided by this embodiment, the difference value between the rotational speed of the engine and the target rotational speed of the engine is stabilized within a certain range, so that the clutch is engaged under the premise that the engine and the drive motor are coordinated. In this way, the impact in the clutch engagement process can be prevented, the risk is reduced, the excessive wear and tear of the clutch is avoided, and the service life is prolonged. And meanwhile, in the process when the rotational speed of the engine is adjusted and the clutch is engaged, the drive motor continuously maintain the operations of the hybrid vehicle and provide a power for the hybrid vehicle together with the engine after the clutch is engaged. In this way, the power output in the whole process can be transited smoothly, the driving comfort of the hybrid vehicle is not affected, and the driving experience is improved.

As an exemplary implementation, referring to FIG. 5, the control system for the clutch engagement of the hybrid vehicle provided by this embodiment also includes an output torque adjustment apparatus 4, configured to adjust an output, torque of the engine and an output torque of the drive motor according to a total required torque after the clutch is engaged. According to the driving requirement, by keeping the total required torque unchanged without affecting the operation of the hybrid vehicle, the output torque adjustment apparatus 4 reallocates the output torque of the engine and the output torque of the drive motor and keeps the parallel drive mode. As an exemplary implementation, in the parallel drive mode, the engine may work at a most economic state and output as a main power, and the residual power is supplementally provided by the drive motor. Therefore, in an exemplary manner, when the output torque adjustment apparatus 4 adjusts the output torque of the engine and the output torque of the drive motor, the output torque of the engine may be increased linearly according to a certain slope and the output torque of the drive motor may be reduced linearly according to a certain slope, making a sum of the output torque of the engine and the output torque of the drive motor equal to the total required torque which is unchanged.

In this embodiment, after the clutch of the hybrid vehicle is engaged, the hybrid vehicle enters the parallel drive mode, and the condition detection and determination apparatus 1 may still continuously detect the various parameters and fault events of the hybrid vehicle. When the various parameters and fault events of the hybrid vehicle meet a certain condition, the engagement apparatus 3 may control the clutch to be disengaged and the hybrid vehicle to exit the parallel drive mode. In an exemplary embodiment, after the clutch is engaged, if the condition detection and determination apparatus 1 determines that any of the following two conditions is met, the engagement apparatus 3 controls the clutch to be disengaged and exit the parallel drive mode.

(1) The current speed v of the hybrid vehicle is smaller than or equal to a second speed set value $v_2$ corresponding to the position of the accelerator pedal at present.

(2) The SOC of the power battery of the hybrid vehicle at the current speed of the hybrid vehicle is out of a second set range $F_2$.

As an exemplary implementation, the second speed set value corresponding to the each position of the accelerator pedal is smaller than the first speed set value, and the second set range includes the first set range. In this way, the effect of a hysteresis loop may be achieved, so that the hybrid vehicle is prevented from operating the clutch frequently at a critical state to damage the clutch.

The control system for the clutch engagement of the hybrid vehicle may execute the control method for the clutch engagement of the hybrid vehicle provided by the embodiments of the present disclosure and has corresponding functional modules for executing the method and beneficial effects.

Each technical characteristic in the above embodiment may be combined freely. For a simple description, not all possible combinations for each technical characteristic in the above embodiment are described. However, the combinations of these technical characteristics should be considered to fall into a scope of the specification if there is no conflict.

The foregoing description only describes several implementation manners of the present disclosure, but is not intended to limit the protection scope of the present disclosure. It is to be noted that, any variation or replacement made by those of ordinary skill in the art without departing from the concept of the present disclosure shall fall within the protection scope of the present disclosure. Therefore, the protection scope of the present disclosure shall be subject to the claims.

What is claimed is:

1. A control method for clutch engagement of a hybrid vehicle, comprising:
when the hybrid vehicle meets a condition of adjusting a rotational speed of an engine, controlling the hybrid vehicle to enter a mode of adjusting the rotational speed of the engine, and determining a target rotational speed of the engine according to a rotational speed of a drive motor as well as transmission ratios of the engine and the drive motor to a drive wheel end and drive relationships of the engine, and the drive motor with the drive wheel end; and
when a difference value between the rotational speed of the engine and the target rotational speed of the engine is constantly smaller than a threshold value within a set time, controlling a clutch of the hybrid vehicle to be engaged, wherein the clutch is respectively connected to the drive motor and the engine.

2. The control method for the clutch engagement of the hybrid vehicle as claimed in claim 1, wherein the hybrid vehicle is determined to meet the condition of adjusting the rotational speed of the engine when the following three conditions are met:
a current speed of the hybrid vehicle is greater than a first speed set value corresponding to a position of an accelerator pedal at present;
a State of Charge (SOC) of a power battery of the hybrid vehicle at the current speed of the hybrid vehicle is within a first set range; and
the hybrid vehicle has no fault event affecting the clutch engagement at present.

3. The control method for the clutch engagement of the hybrid vehicle as claimed in claim 2, after the clutch is engaged, in a case where the current speed of the hybrid vehicle is smaller than or equal to a second speed set value corresponding to the position of the accelerator pedal at present, or the SOC of the power battery of the hybrid vehicle at the current speed of the hybrid vehicle is out of a second set range, controlling the clutch to be disengaged.

4. The control method for the clutch engagement of the hybrid vehicle as claimed in claim 3, wherein the second speed set value is smaller than the first speed set value and the second set range comprises the first set range.

5. The control method for the clutch engagement of the hybrid vehicle as claimed in claim 2, wherein the first speed set value corresponding to each position of the accelerator pedal is stored in a vehicle controller of the hybrid vehicle in advance.

6. The control method for the clutch engagement of the hybrid vehicle as claimed in claim 2, wherein the first set range $F_1$ of the SOC of the corresponding power battery within which the mode of adjusting the speed of the engine is to be entered is stored in the vehicle controller in advance.

7. The control method for the clutch engagement of the hybrid vehicle as claimed in claim 1, after the clutch is engaged, adjusting an output torque of the engine and an output torque of the drive motor according to a total required torque.

8. The control method for the clutch engagement of the hybrid vehicle as claimed in claim 7, wherein adjusting the output torque of the engine and the output torque of the drive motor according to the total required torque comprises:
linearly increasing the output torque of the engine and linearly reducing the output torque of the drive motor, making a sum of the output torque of the engine and the output torque of the drive motor equal to the total required torque.

9. The control method for the clutch engagement of the hybrid vehicle as claimed in claim 1, wherein in the mode of adjusting, the rotational speed of the engine, the rotational speed of the engine is adjusted by controlling a rotational speed of an ISG coaxially connected with the engine.

10. The control method for the clutch engagement of the hybrid vehicle as claimed in claim 1, wherein in the mode of adjusting the rotational speed of the engine, the rotational speed of the engine is adjusted by using Proportion-Integral-Derivative (PID) control.

11. The control method for the clutch engagement of the hybrid vehicle as claimed in claim 1, wherein whether the hybrid vehicle meets the condition of adjusting the rotational speed of the engine or not is determined by a vehicle controller of the hybrid vehicle according to an operation state of the hybrid vehicle.

12. The control method for the clutch engagement of the hybrid vehicle as claimed in claim 1, wherein whether the hybrid vehicle meets the condition of adjusting the rotational speed of the engine or not is determined by a vehicle controller of the hybrid vehicle according to an instruction input by a driver of the hybrid vehicle.

13. The control method for the clutch engagement of the hybrid vehicle as claimed in claim 1, wherein determining the target rotational speed of the engine according to the rotational speed of the drive motor as well as the transmission ratios of the engine and the drive motor to the drive wheel end and the drive relationships of the engine and the drive motor with the drive wheel end comprises:

determining the target rotational speed of the engine according to a following formula:

$$\omega_0 = \frac{\omega r_1}{r_2}$$

where $\omega_0$ is the target rotational speed of the engine, $\omega$ is the rotational speed of the drive motor, $r_1$ is the transmission ratio of the drive motor to the drive wheel end, and $r_2$ is the transmission ratio of the engine to the drive wheel end.

14. A control system for clutch engagement of a hybrid vehicle, comprising:
   a condition detection and determination apparatus, configured to determine whether the hybrid vehicle meets a condition of adjusting a rotational speed of an engine;
   an engine speed adjustment control apparatus, configured to control, when the hybrid vehicle meets the condition of adjusting the rotational speed of the engine, the hybrid vehicle to enter a mode of adjusting the rotational speed of the engine, and determine a target rotational speed of the engine according to a rotational speed of a drive motor as well as transmission ratios of the engine and the drive motor to a drive wheel end and drive relationships of the engine and the drive motor with the drive wheel end; and
   an engagement apparatus, configured to control, when a difference value between the rotational speed of the engine and the target rotational speed of the engine is constantly smaller than a threshold value within a set time, a clutch of the hybrid vehicle to be engaged, where the clutch is respectively connected to the drive motor and the engine.

15. The control system for the clutch engagement of the hybrid vehicle as claimed in claim 14, further comprising an output torque adjustment apparatus, configured to adjust, after the clutch is engaged, an output torque of the engine and an output torque of the drive motor according to a total required torque.

16. The control system for clutch engagement of the hybrid vehicle as claimed in claim 15, wherein the output torque adjustment apparatus is configured to: linearly increase the output torque of the engine and linearly reduce the output torque of the drive motor, making a sum of the output torque of the engine and the output torque of the drive motor equal to the total required torque.

17. The control system for clutch engagement of the hybrid vehicle as claimed in claim 15, wherein in the mode of adjusting the rotational speed of the engine, the rotational speed of the engine is adjusted by controlling a rotational speed of an ISG coaxially connected with the engine: or, in the mode of adjusting the rotational speed of the engine, the rotational speed of the engine is adjusted by using Proportion-Integral-Derivative (PID) control.

18. The control system for clutch engagement of the hybrid vehicle as claimed in claim 14, wherein the condition detection and determination apparatus is configured to determine that the hybrid vehicle meets the condition of adjusting the rotational speed of the engine when the following three conditions are met:
   a current speed of the hybrid vehicle is greater than a first speed set value corresponding to a position of an accelerator pedal at, present;
   a State of Charge (SOC) of a power battery of the hybrid vehicle at the current speed of the hybrid vehicle is within a first set range; and
   the hybrid vehicle has no fault event, affecting the clutch engagement at present.

19. The control system for clutch engagement of the hybrid vehicle as claimed in claim 14, wherein the control system is further configured to control, after the clutch is engaged, in a case where the current speed of the hybrid vehicle is smaller than or equal to a second speed set value corresponding to the position of the accelerator pedal at present, or the SOC of the power battery of the hybrid vehicle at the current speed of the hybrid vehicle is out of a second set range, the clutch to be disengaged.

20. The control system for clutch engagement of the hybrid vehicle as claimed in claim 19, wherein the second speed set value is smaller than the first speed set value and the second set range comprises the first set range.

* * * * *